United States Patent [19]

Isono

[11] 4,360,214
[45] Nov. 23, 1982

[54] SHOCK ABSORBING DEVICE FOR REAR WHEEL OF MOTORCYCLE

[75] Inventor: Tokio Isono, Tokyo, Japan

[73] Assignee: Honda Giken Kogyo Kabushiki Kaisha, Tokyo, Japan

[21] Appl. No.: 192,638

[22] Filed: Sep. 30, 1980

[30] Foreign Application Priority Data

Oct. 4, 1979 [JP] Japan .......................... 54-137548[U]

[51] Int. Cl.$^3$ ............................................. B62K 25/26
[52] U.S. Cl. .................................................. 280/284
[58] Field of Search ................................ 280/284, 285

[56] References Cited

U.S. PATENT DOCUMENTS

| 4,058,181 | 11/1977 | Buell ................................. | 280/284 |
| 4,175,764 | 11/1979 | Johnson .............................. | 280/284 |
| 4,265,329 | 5/1981 | De Cortange ...................... | 280/284 |

FOREIGN PATENT DOCUMENTS 2852441  9/1979  Fed. Rep. of Germany ...... 280/284

*Primary Examiner*—Robert R. Song

*Attorney, Agent, or Firm*—Irving M. Weiner; Pamela S. Burt; John L. Shortley

[57] ABSTRACT

A shock absorbing device for a rear wheel of a motorcycle which comprises a rotary member which is pivotally connected to a body frame at its front end and moreover is pivotally connected to a swingable rear wheel support frame, a shock absorber which is pivotally connected to the body frame at its upper end and is connected to the rotary member at its lower end, and a rod member for connecting the rotary member to the body frame.

In order to locate the shock absorber as close as possible to the center of gravity of the motorcycle, the rotary member is arranged at a fore part of the rear wheel support frame in the longitudinal direction, and a lower end of the shock absorber is connected to a front part of an upper portion of the rotary member in the longitudinal direction. Further in order to enhance the strength of the rear wheel support frame, a rear part of the upper portion of the rotary member is pivotally connected to the rear wheel support frame, whereas a lower portion of the rotary member is connected to a rear end of the rod member.

14 Claims, 18 Drawing Figures

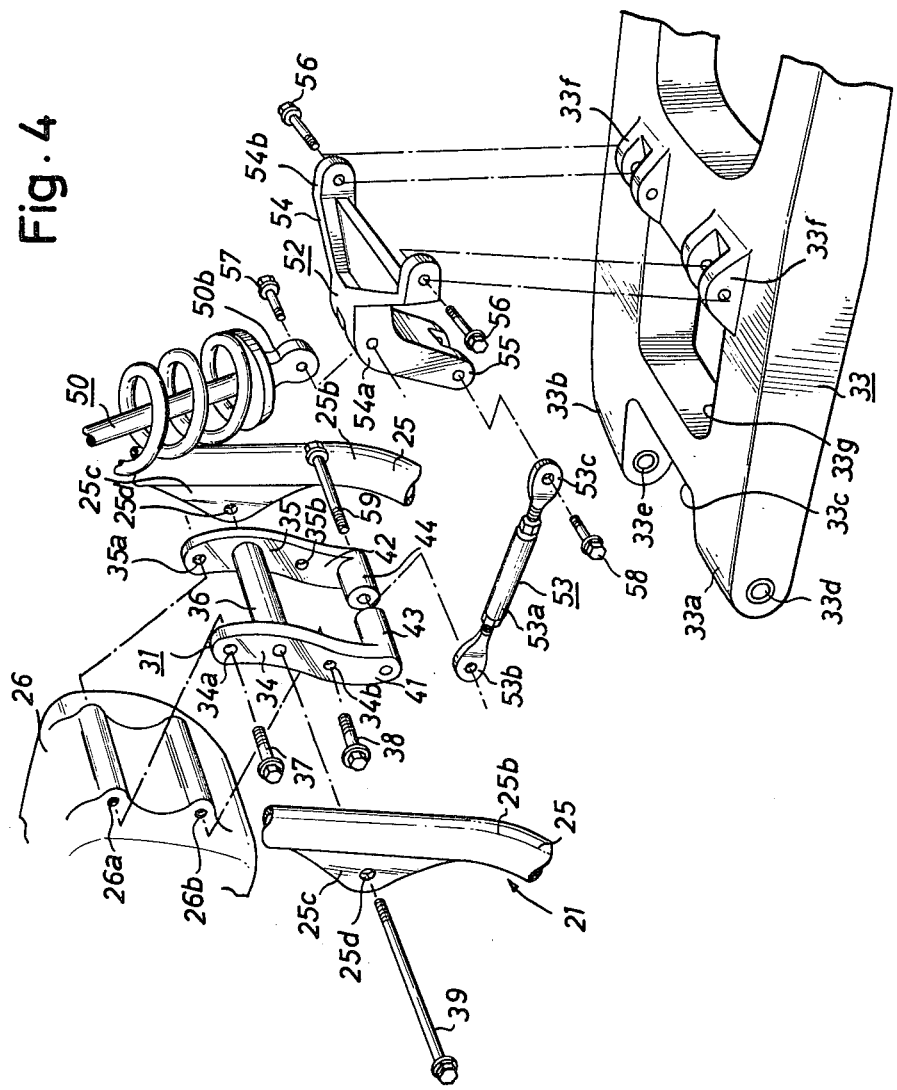

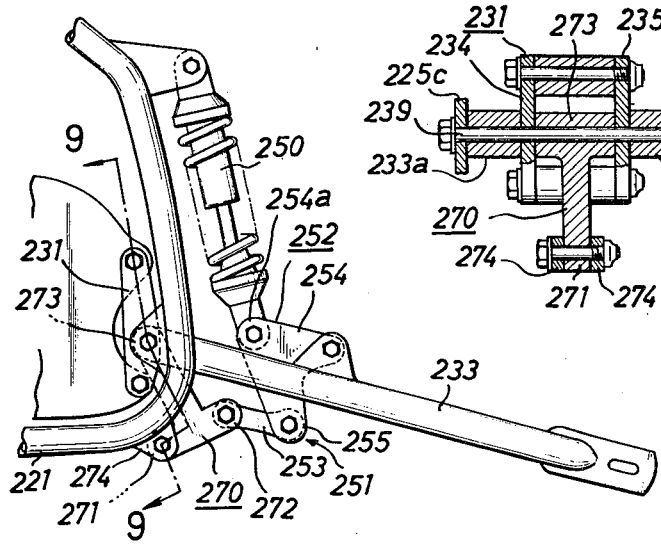
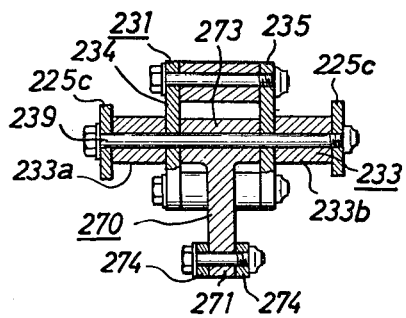
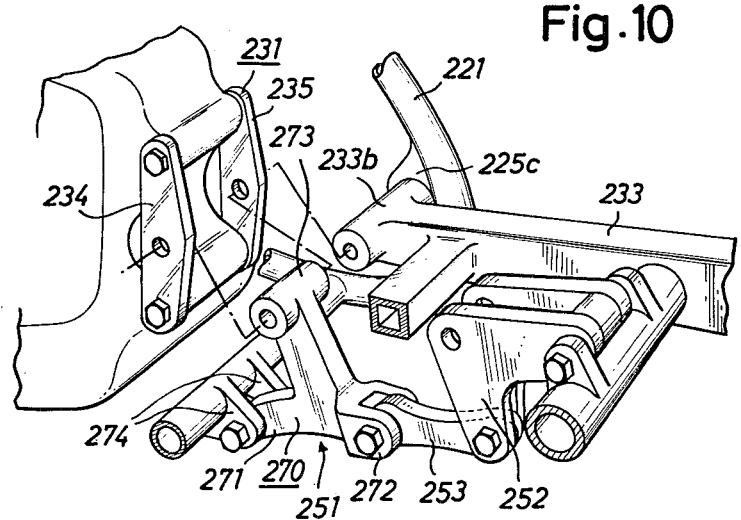

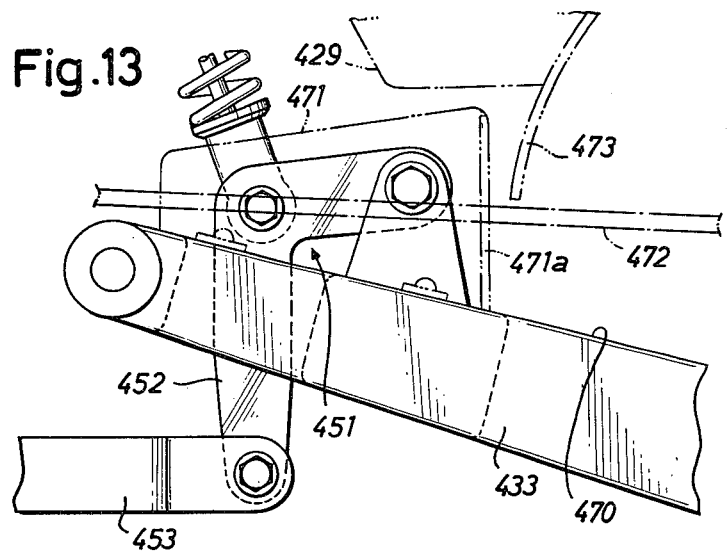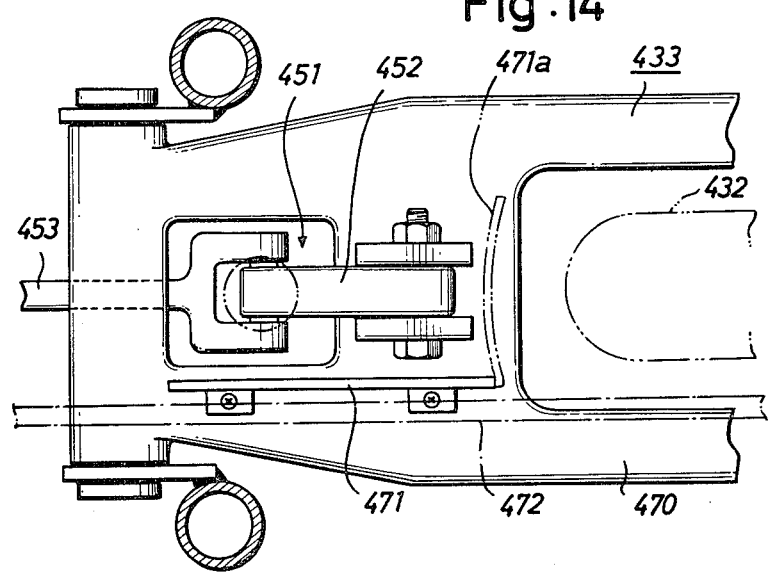

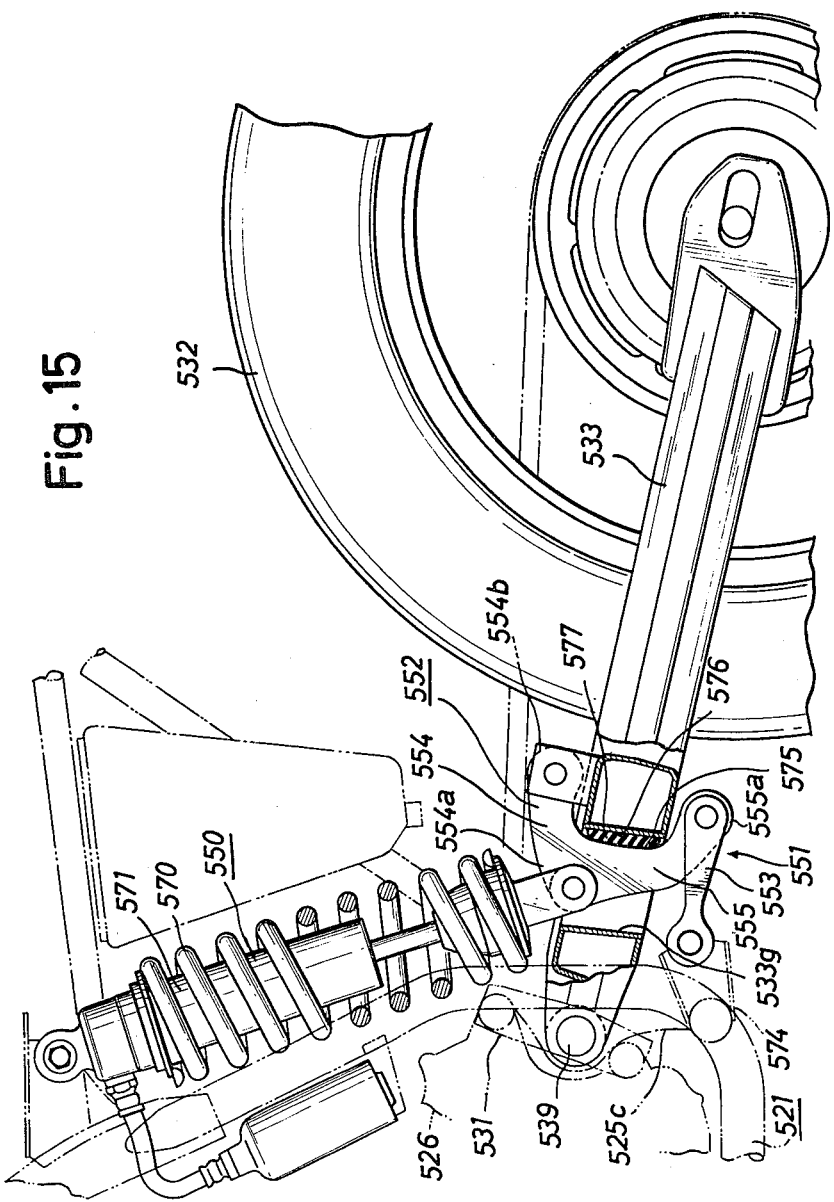

SHOCK ABSORBING DEVICE FOR REAR WHEEL OF MOTORCYCLE

The present invention relates to a shock absorbing device for a rear wheel of a motorcycle which is constructed such that an increased amount of shock absorbing force of a progressive type shock absorber prevails over that of swinging movement of the a rear wheel support frame.

A motocross or off-road motorcycle which is intended for use on rugged terrain is usually designed in such a manner that a swingable rear wheel support frame such as a rear fork or the like has a degree of vertical swinging movement greater than that of ordinary motorcycles. Further, it is recognized with this type of off-road motorcycle that its shock absorbing property provided by a shock absorbor for the rear wheel is not in proportion to upward displacement of swinging movement of the rear wheel support frame when a progressive type shock absorbing device is employed which is so designed that an increased amount of shock absorbing force of the shock absorber is at a higher increasing rate than that of the swinging movement of the rear wheel support frame.

One shock absorbing device of such type is described in U.S. patent application filed on Feb. 7, 1980 and accorded Ser. No. 119,485 claiming priority from Japanese U.M. Application Nos. 54-16827 and 54-1682on Feb. 13, 1979. Such device has a mechanism wherein a rotary member vertically swingably pivoted on the rear wheel support frame is connected to a lower end of the shock absorber pivotally connected to a body frame at its upper end. The body frame is connected to the aforesaid rotary member by way of a rod member, and the rotary member is adapted to be rotated by an axial load on the rod member caused by swinging movement of the rear wheel support frame. Thereby, the shock absorber has an increased amount of contractive deformation, resulting in a large shock absorbing force, whereby the required shock absorbing properties are ensured in such a manner that the shock absorbing force increases along a curved trace. This type of shock absorbing device provides excellent riding comfort because the shock load transmitted from the road surface to the body frame via the rear wheel can be effectively absorbed.

In order to provide required excellent maneuverability and stability for the off-road motorcycle, endeavors have been made to reduce an inertia moment about the center of gravity of the motorcycle. Further, in view of the fact that the shock absorber has a relatively large amount of weight, it is required that the inertia moment of a motorcycle with a progressive mechanism incorporated therein be reduced while taking into account the arrangement and connecting points of the shock absorber, the progressive mechanism being constructed of the rotary member and rod member so as to effect the contraction of the shock absorber. Furthermore in view of the fact that as the shock absorber is subjected to contractive deformation due to upward swinging movement of the rear wheel support frame, the contractive deformation being caused at an increasing rate higher than that of the aforesaid swinging movement, the rear wheel support frame is affected by a counter-action of high repulsive force generated by the aforesaid contractive deformation, it is also required that the working point of the repulsive force be selectively located in the optimum manner so that the rear wheel support frame is advantageously strong.

The present invention is provided so as to meet the requirements as described above, taking into account the described background of the conventional motorcycle.

SUMMARY OF THE INVENTION

It is a principal object of the present invention to provide a shock absorbing device for a rear wheel of a motorcycle which has excellent maneuverability and stability due to an arrangement wherein a rotary member is located at a position ahead of a central part, as in the longitudinal direction of the motorcycle, of a rear wheel support member and a shock absorber is connected to a front part of an upper portion of the rotary member at its lower end, the shock absorber being pivotally connected to a body frame at its upper end. In this manner, the shock absorber is located as close as possible to the center of gravity which exists in the periphery of an engine ahead of the rear wheel support frame to reduce inertia moment about the center of gravity of the motorcycle. The shock absorbing device assures a favorable shock absorbability necessary for off-road motorcycles and the like due to a large compression stroke of the shock absorber provided with the aid of a progressive mechanism comprising the rotary member and a rod member, even with the shock absorber being disposed on a fore part of the rear wheel support frame, as described above.

It is also an object of the present invention to provide a shock absorbing device for a rear wheel of a motorcycle whereby the rear wheel support frame is advantageously strong due to an arrangement wherein the rotary member is connected to the body frame at its lower portion by way of the rod member and the upper portion of the rotary member is pivotally connected to the rear wheel support frame at its rear part, in the longitudinal direction of the motorcycle. Thus, the working point of the repulsive force upon the rear wheel support frame due to the contractive deformation of the shock absorber can be dislocated rearwardly of the shock absorber to thus reduce the load on the rear wheel support frame even with the shock absorber and rotary member being disposed on the fore part of the rear wheel support frame, the rotary member serving for transmitting the repulsive force to the rear wheel support frame.

It is another object of the present invention to provide a shock absorbing device for a rear wheel of a motorcycle which is constructed such that connection between the body frame and a front end of the rod member is made with the use of a member which is obtained merely by a partial modification of a conventional member of the motorcycle, thus enabling the rod member, which is subjected to large axial load, to be effectively connected with the aid of the mechanical strength of the aforesaid conventional member.

It is still another object of the present invention to provide a shock absorbing device which is constructed such that the shock absorbing property of the shock absorber can be favorably changed or adjusted relative to the swinging movement of the rear wheel support frame by means of a rod member which has an adjustable length or by connecting the shock absorber with a rotary member having a lower portion of various shapes designed for desired shock absorbing properties, the lower portion being connected with a rear end of the rod member.

Other objects and advantageous features of the present invention will be apparent from the following description with reference to the accompanying drawings.

BRIEF DESCRIPTION OF THE DRAWINGS

FIG. 4 is a perspective view of the shock absorbing device, wherein the components thereof are illustrated in a disassembled state.

FIG. 8 is a side view of a shock absorbing device in accordance with another modified embodiment of the present invention, wherein an intermediate bracket member is interposed between the rod member and the body frame.

FIG 9 is a cross sectional view of the shock absorbing device, taken along the line 9—9 in FIG. 8.

FIG. 10 is a perspective view of the shock absorbing device in FIG. 8, wherein the device is illustrated in a disassembled state.

FIG. 13 is a side view of a shock absorbing device in accordance with another modified embodiment of the present invention, wherein an arrangement is made such that mud carried by the chain is prevented from adhering to the progressive mechanism.

FIG. 14 is a plan view of the device in FIG. 13.

FIG. 15 is a side view of a motorcycle for on-road driving provided with a shock absorbing device according to the present invention.

DETAILED DESCRIPTION OF PREFERRED EMBODIMENTS OF THE INVENTION

Figure 1:
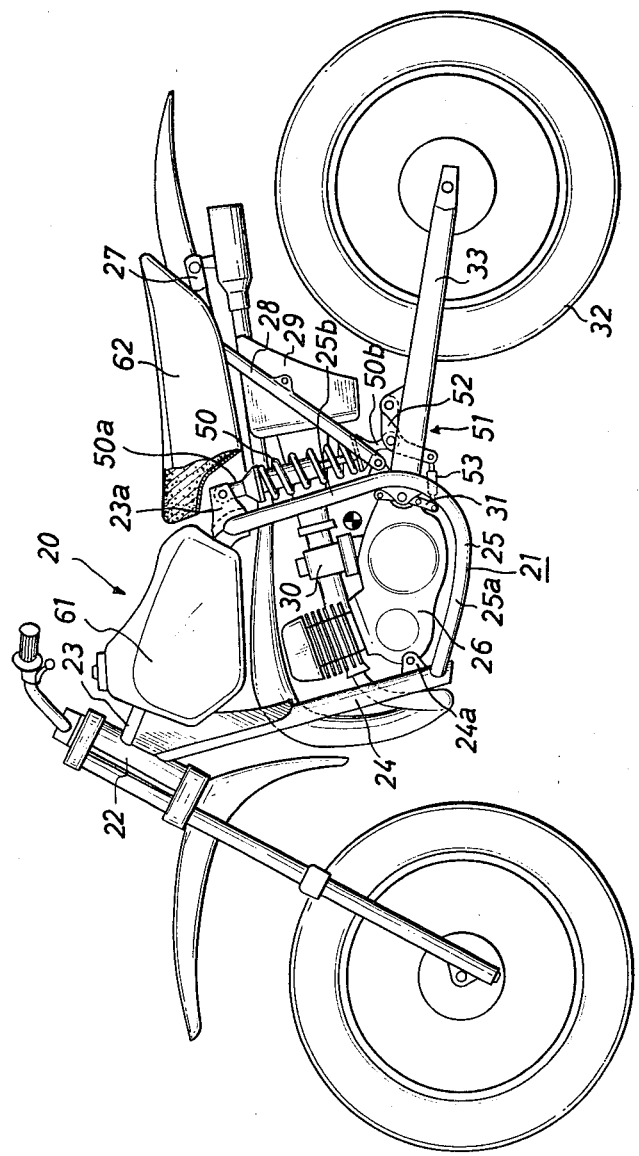
FIG. 1 is a side view of a motorcycle with a shock absorbing device according to the invention.

In FIG. 1, a motorcycle designed for off-road driving is designated by the reference numeral 20. A body frame 21 on the motorcycle 20 comprises a main frame 23 extending rearwardly from a head pipe 22, a down tube 24 extending down in the rearward direction from the head pipe 22 and a rear frame 25 which serves for connecting the main frame 23 with the down tube 24, thus forming a closed loop when seen from the side. A front end of a lower part 25a of the rear frame 25 is connected to a lower end of the down tube 24, whereas an upper end of a standing part 25b of the rear frame 25 extending upwardly from a rear end thereof is connected to a rear end of the main frame 23.

An engine 26 for the motorcycle is stationarily mounted on the bottom part 25a of the rear frame 25 within the body frame 21, and an air cleaner case 29 is fixed to an inclined subframe 28 which serves for connecting the standing part 25b of the rear frame 25 to a seat rail 27. Atmospheric air purified through the air cleaner is introduced into the engine 26 via a carburetor 30.

A front part of the engine 26 is secured to a bracket 24a of the down tube 24 and a rear part of the engine 26 is secured to the standing part 25b of the rear frame 25 in a known manner with the aid of a bracket member 31 for hanging the engine, the bracket member 31 being partially modified from a conventional one in shape, so that the engine 26 is stationarily mounted onto the body frame 21. Further, the bracket member 31 serves to vertically swingably support a front end of a rear wheel support frame 33 together with the engine 26 on the body frame 21, the rear wheel support frame 33 having a rear wheel 32 rotatably supported at its rear end.

Figure 3:
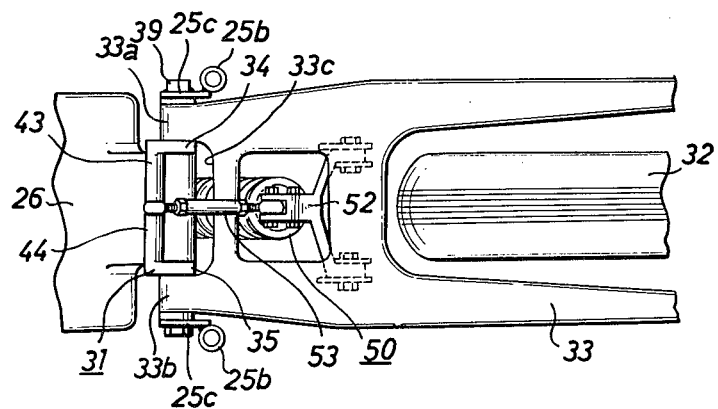
FIG. 3 is a partial plan view of the motorcycle in FIG. 2, shown from the bottom.

The bracket member as designated by the reference numeral 31 will be described in greater detail with reference to FIG. 4 particularly with respect to the mounting of the engine and the pivotal supporting of the rear wheel support frame. As illustrated in FIG. 4, the bracket member 31 is constructed of both side plates 34 and 35 and a tubular member 36 connecting the plates 34 and 35 in the form of a gate with superior strength and rigidity, the side plates 34 and 35 being formed with drilled holes 34a, 34b, 35a and 35b which are located above and below the tubular member 36. The rear wheel support frame 33 in the form of a rear fork in this embodiment is integrally provided on its front end with right and left projections 33a and 33b. The bracket member 31 is secured to the rear part of the engine 26 by locating the bracket member 31 in position at the rear part of the engine 26, aligning the drilled holes 34a and 35a with threaded holes 26a of the engine 26 and the drilled holes 34b and 35b with threaded holes 26b of the engine 26, then inserting bolts 37 and 38 through the drilled holes and screwing them into the threaded holes, as required. Next, by applying the projections 33a and 33b of the rear fork 33 on respective outside portions of the side plates 34 and 35 of the bracket member 31, member 31 is received within a front recess 33c of the rear fork 33, as illustrated in FIG. 3. It is to be noted that the above described mounting steps are performed in a space between the standing parts 25b, 25b of a pair of rear frames 25, 25 and that by inserting a pivot shaft 39 through drilled holes 25d, 25d of brackets 25c, 25c of the standing parts 25b 25b, drilled holes 33d and 33e of the projections 33a and 33b of the rear fork 33; and a through hole of the tubular member 36 of the bracket member 31; the rear part of the engine 26 is connected to the body frame 21 by way of the bracket member 31 and moreover the rear fork 33 is vertically swingably pivoted at the front end thereof to the body frame 21 as well as the engine 26 by means of the bracket member 31.

The bracket member 31, which constitutes an essential component for the motorcycle in the above described manner and serves as an engine hanger, is partially modified from the conventional bracket particularly with respect to its configuration in accordance with the present invention. Specifically, the side plates 34 and 35 have their extensions 41 and 42 located below the drilled holes 34b and 35b, and further the extensions 41 and 42 have their tubular projections 43 and 44 integrally formed on their inner sides and opposing each other with a certain clearance therebetween.

Figure 2:
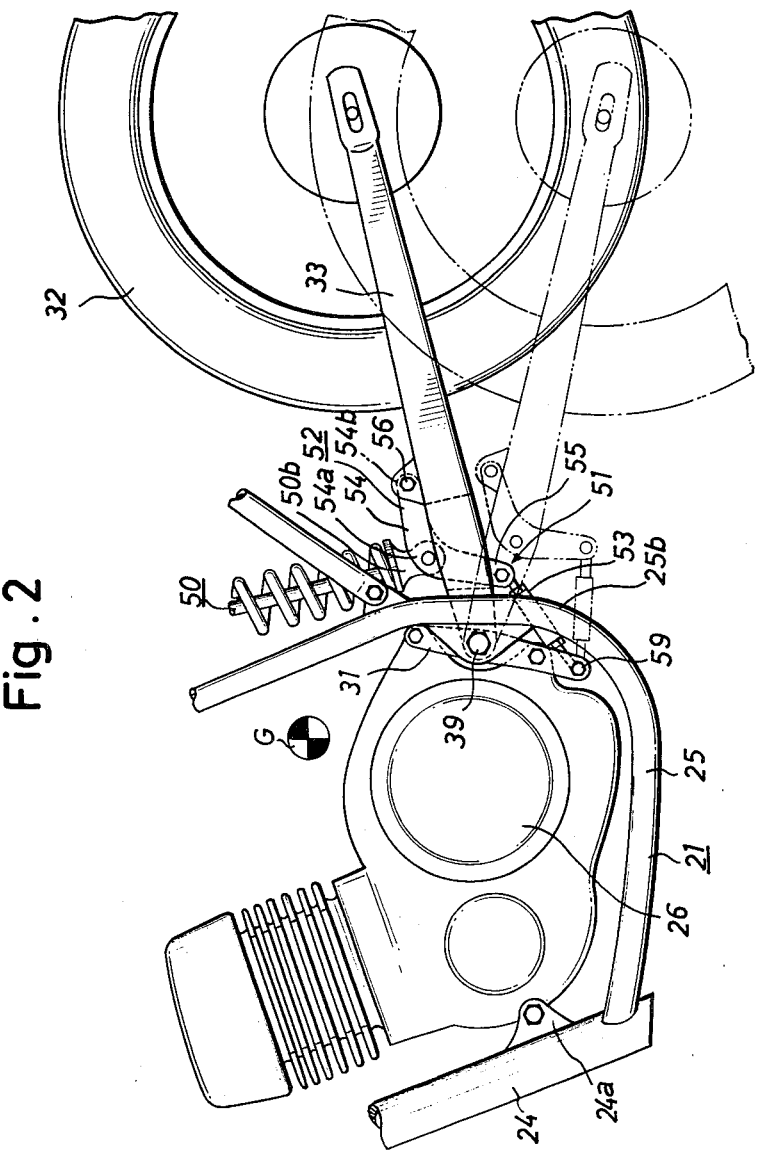
FIG. 2 is a partial side view of the motorcycle in FIG. 1, shown in an enlarged scale, wherein the action of a progressive mechanism during swinging movement of a rear wheel support frame is illustrated.

In order to effect a shock absorbing function of the vertical swinging movement of the rear wheel 32 and rear fork 33 about the pivot shaft 39 as a fulcrum, the rear fork 33 being suspended on the body frame 21, there is arranged a shock absorber 50, as illustrated in FIG. 1. The shock absorber 50 is longitudinally swingably pivoted on a bracket 23a at its upper end 50a, the bracket 23a being secured to the main frame 21, wherein the upper end 50a of the shock absorber 50 is located between a fuel tank 61 and a seat 62. A lower end 50b of the shock absorber 50 is connected to the rear fork 33 as well as to the body frame 21 by way of a rotary member 52 and a rod member 53 which together constitute a progressive mechanism 51 having a link-like motion. As shown in FIG. 2, the rotary member 52 has substantially an inverted L-shaped form by a combination of its upper portion 54 and lower portion 55. Further, a front part 54a and rear part 54b, in the longitudinal direction of the motorcycle, of the upper portion 54, as well as a lowermost end of the lower portion 55, define the corners of a triangle respectively. The rotary member 52 is located in a central part of the rear fork 33, in the transverse direction of the motorcycle, and ahead of a central part of the rear fork 33, in the longitudinal direction. Further, as illustrated in FIG. 4, the rear part 54b, which is fork-shaped, of the rotary member 52 is vertically swingably pivoted on bosses 33f, 33f formed on the upper surface of the rear fork 33, using bolts 56, 56. The front part 54a of upper portion 54 of the rotary member 52, that is, a bent portion of the substantially inverted L-shaped rotary member 52, is rotatably pivotally connected to the lower end 50b of the shock absorber 50 by means of a bolt 57. The lower portion 55 of the rotary member 52 extends downwardly through an opening 33g formed through the rear fork 33.

The rod member 53 comprises a rod body 53a and turn-buckle type front and rear rod ends 53b and 53c threadably connected to the rod body 53a, so that the length of the rod member 53 can be adjusted by rotating the rod body 53a to displace the rod ends 53b and 53c forwards or backwards. The rear rod end 53c is pivotally connected to the lower portion 55 of the rotary member 52 by means of a bolt 58, the lower portion 55 being protruded downwardly from the lower surface of the rear fork 33, whereas the front rod end 53b is pivotally connected to the tubular projections 43 and 44 of the bracket member 31 by means of a bolt 59, the front rod end 53b being located between the tubular projections 43 and 44. As a result, the rear end of the rod member 53 is connected to the rotary member 52 and the front end of the same is connected to the body frame 21 by way of the bracket member 31, whereby the rotary member 52 is connected to the body frame 21 at its lower part by way of the rod member 53.

Because the rotary member 52 is located ahead of the central part of the rear fork 33, in the longitudinal direction, and the lower end 50b of the shock absorber 50 is pivotally connected to the front part 54a of the upper portion 54 of the rotary member 52, as illustrated in FIG. 2, the shock absorber 50 is disposed on the front side of the rear fork 33 so that the location of shock absorber 50 approaches the center of gravity (G) of the motorcycle, the center of gravity (G) being found ahead of the rear fork 33 around the circumference of the engine 26. As a result, the inertia moment of the motorcycle about the center of gravity (G) is decreased by an extent corresponding to the forward dislocation of the shock absorber 50, which has a relatively large amount of weight, whereby maneuvrability and stability of the motorcycle are substantially improved.

When the motorcycle travels on a rugged road and the rear wheel 32 is displaced upwardly, causing the rear fork 33 to swing upwardly about the pivot shaft 39 from a position as illustrated by the chain lines to another position as illustrated by the full lines, in FIG. 2, the rotary member 52 is also displaced upwardly, because its rear part 54b is pivotally connected to the rear fork 33. Further, because the rotary member 52 has the rod member 53 at its lower part 55, the rod member 52 being adapted to follow a circular trace about the bolt 59, the aforesaid upward displacement causes a rotary movement of the rotary member 52 about the bolt 56 in the clockwise direction in FIG. 2 and thereby the shock absorber 50 becomes contracted by a stroke corresponding to the swinging movement of the rear fork 33 and the rotary movement of the rotary member 52. As a result, a shock absorbing force is generated in the form of a repulsive force against the contraction of the shock absorber 50 in response to the upward displacement of the rear wheel 32. The rotary moment of the rotary member becomes increasingly large, as the upward displacement of the rear fork 33 increases, and, the shock absorbing property of the shock absorber 50 thus shows a progressive property such that the rotary movement of the rotary member 52 increases following a curved trace relative to the upward displacement of the rear fork 33. Thus, in spite of the fact that the shock absorber 50 is arranged near the fulcrum of the swinging movement of the rear fork 33, the progressive mechanism comprising the rotary member 52 and the rod member 53 enables the shock absorber 50 to achieve a long stroke of contraction, thus providing the required shock absorbing effect for the off-road motorcycle.

When the shock absorber 50 is subjected to a contraction in the fully compressed state or in the almost fully compressed state, a very large downward repulsive force caused by the contractive deformation is transmitted to the rotary member 52 and works on the rear fork 33. The position where the aforesaid repulsive force works is located at the bolt 56. Due to the fact that the bolt 56 is dislocated rearwardly of the shock absorber 50, the load exerted on the rear fork 33 is reduced by an extent corresponding to the aforesaid dislocation, resulting in improved strength of the rear fork 33. Further the very large downward repulsive force is converted to an axial pulling force on the rod member 53 via the rotary member 52. However, because the rod member 53 is connected to the bracket member 31 which is designed in a gate-shaped form and has excellent strength and rigidity, the shock absorbing device in accordance with the present invention is constructed such that the aforesaid axial pulling force is satisfactorily resisted by means of the bracket member 31 which is partially modified from a conventional bracket particularly in its configuration, the bracket member 31 being provided to mount the engine 26 onto the body frame 21.

The shock absorbing property of the shock absorber 50 relative to the swinging movement of the rear fork 33 is associated with the length of the rod member 53 and as described above, the rod member 53 is designed so as to be adjustable in its length. Thus, the shock absorbing property of the device can be altered, depending on road conditions and the like.

Figure 5A:
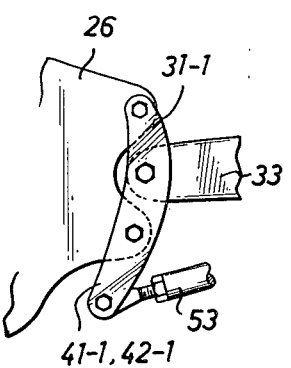
FIGS. 5A, 5B and 5C are side views of exemplary bracket members for use as an engine hanger which is intended to connect a front end of a rod member to a body frame.
Figure 5B:
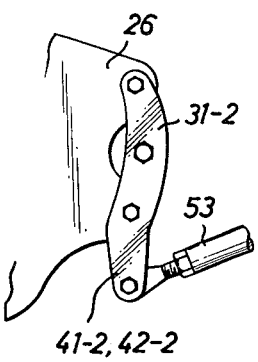
Figure 5C:
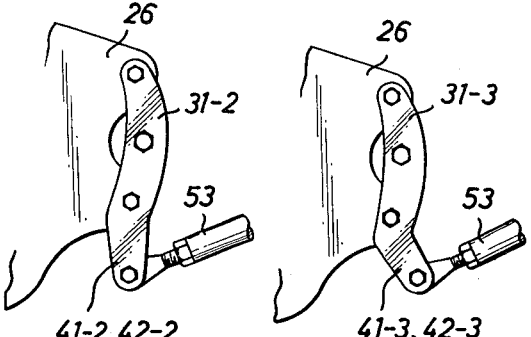

FIGS. 5A, 5B and 5C illustrate various examples of engine hanger bracket members 31-1, 31-2 and 31-3 in accordance with modified embodiments of the present invention, respectively, each of which is adapted to alter the shock absorbing property within an enlarged range. The bracket member 31-1 as illustrated in FIG. 5A has lower extensions 41-1 and 42-1 which are inclined in a downwardly forward direction. The bracket member 31-2 as illustrated in FIG. 5B has lower extensions 41-2 and 42-2 which extend in the substantially vertical direction. Further, the bracket member 31-3 as illustrated in FIG. 5C has lower extensions 41-3 and 42-3 which are inclined in a downwardly rearward direction. Preparation of a plurality of bracket members 31-1, 31-2 and 31-3 which have their directions of extension longitudinally different from one another and selective mounting of one of the bracket members 31-1, 31-2 and 31-3 in consideration of road conditions and the like, the bracket members 31-1, 31-2 and 31-3 being detachably connected to the body frame, will make it possible to provide the same effect as altering the length of the rod member 53.

Figure 6:
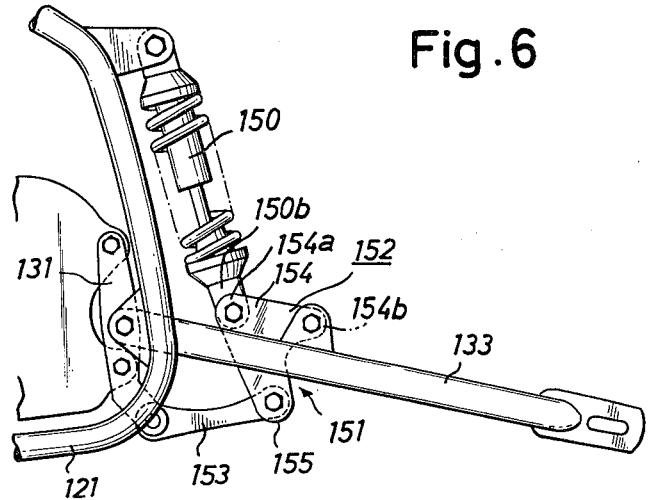
FIG. 6 is a side view of a shock absorbing device wherein a rotary member in accordance with a modified embodiment of the present invention is employed.
Figure 7:
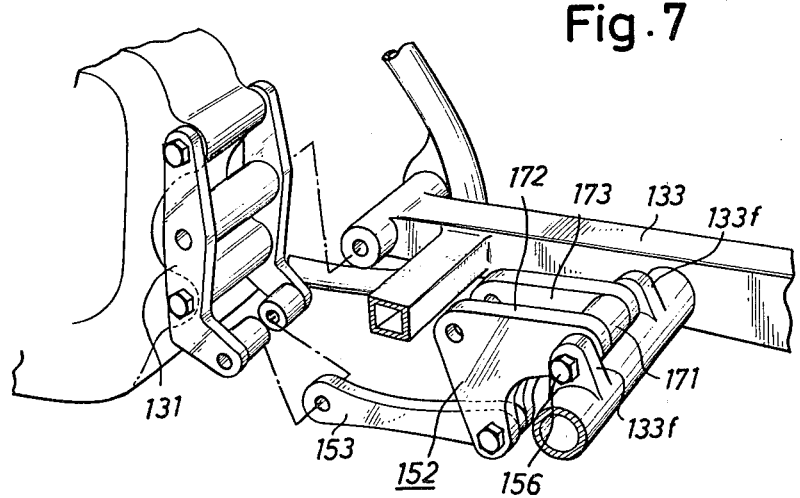
FIG. 7 is a perspective view of the shock absorbing device in FIG. 6, wherein the device is illustrated in a disassembled state.

FIGS. 6 and 7 illustrate a modified progressive mechanism designated by the reference numeral 151 which is characterized in that a rotary member 152 is constructed in a manner different from the preceding embodiment. Other details of construction, such that the rotary member 152 is located ahead of a central part of a rear fork 133, in the longitudinal direction of the motorcycle, that an upper portion 154 of the rotary member 152 is pivotally connected to the rear fork 133 at its rear part 154b, that a lower end 150b of a shock absorber 150 is pivotally connected to a front part 154a of the rotary member 152 and that a lower part 155 of the rotary member 152 is operatively connected to an engine hanger bracket member 131 located in the vicinity of an engine frame 121 by way of a rod member 153 are substantially the same as those in the preceding embodiment of the invention. The rotary member 152 in accordance with this embodiment of the invention differs from that in the preceding embodiment in that the lower portion 155 of the rotary member 152 extends downwardly rearwards beyond the front part 154a of the upper portion 154, i.e., is dislocated rearwardly of said front part 154a and, thus, the rotary member 152 has a substantially inverted-L-shaped configuration, as seen from the side, in the same manner as the rotary member 52 in the preceding embodiment but has a sector angle smaller than that in the preceding embodiment at its bent portion. In practice, this sector angle is related to the shock absorbing property of the device. Thus, it is important to select a suitable rotary member having a sector angle which is designed according to the type of motorcycle. Specifically, the rotary member 152 in accordance with this embodiment of the invention is constructed of two parallel plates 172 and 173 with a space 171 interposed therebetween, and is pivotally connected to the rear fork 133 at its brackets 133f, 133f by means of a bolt 156, as illustrated in FIG. 7.

FIGS. 8, 9 and 10 illustrate a further modified progressive mechanism 251 according to the present invention which comprises a rotary member 252 and a rod member 253, the rotary member 252 being connected to a body frame 221 via an intermediate bracket member 270. The intermediate bracket member 270, designed in the form of three legs, comprises a first extension 271 extending forwardly, a second extension extending rearwardly and a third extension 273 extending in a forwardly upward direction. Particularly, the first extension 271 is connected to bracket 274, 274 of the body frame 221, whereas the third extension 273 is inserted in a space between right and left side plates 234 and 235 of an engine hanger bracket member 231 and then is connected to brackets 225c, 225c of the body frame 221 together with right and left projections 233a and 233b of a rear fork 233 by means of a common pivot shaft 239, as illustrated in FIG. 9. Thus, the intermediate bracket member 270 is connected to the body frame 221 at its upper and lower locations, whereas the second extension 272 protrudes rearwardly. A rear part of the second extension 272 is connected to a front end of the rod member 253 which is in turn connected to a lower portion 255 of the rotary member 252.

The arrangement of the intermediate bracket 270 as described above makes it possible to shorten the length of the rod member 253 by an extent equivalent to the rearward protrusion of the second extension 272 and to thus improve the strength of the rod member 253, even though the inverted-L-shaped rotary member 252 has a reduced sector angle at a front part 254a of its upper portion 254 thereof. Further, because the intermediate bracket member 270 is detachably connected to the body frame 221 it becomes easier to perform maintenance service for the progressive mechanism 251 and moreover an increased amount of freedom of design is ensured. Furthermore, because the intermediate bracket member 270 is connected to the body frame 221 at the upper and lower locations, the high axial load on the rod member 253 caused during contractive deformation of a shock absorber 250 is transmitted to the body frame 221 in a distributed manner. Thus, the load is advantageously supported by the body frame 221.

Figure 11:
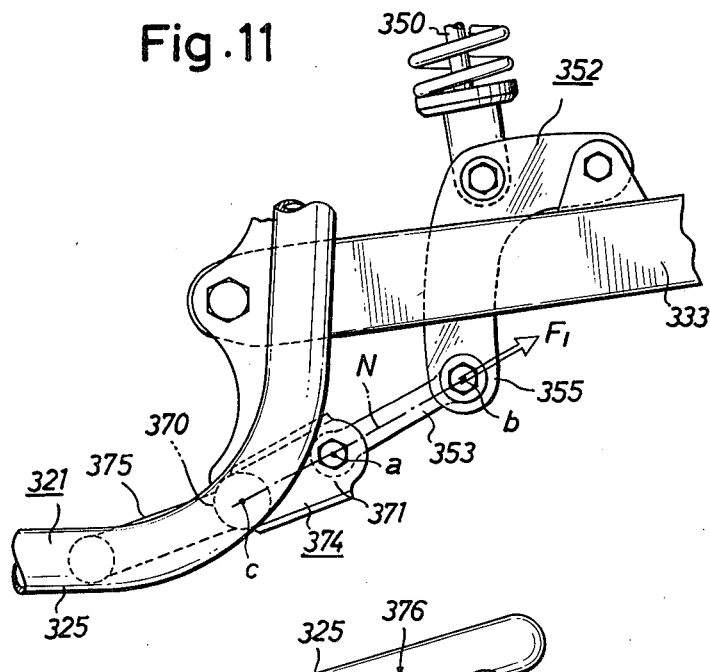
FIG. 11 is a partial side view of a shock absorbing device in accordance with another modified embodiment of the present invention, wherein an arrangement is made such that the axial load of the rod member will not impart a twisting force to a bracket secured to the body frame.
Figure 12:
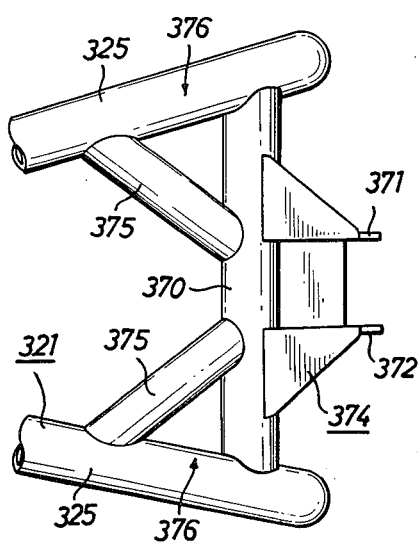
FIG. 12 is a plan view of the body frame and the bracket in FIG. 11, shown from the bottom.

FIGS. 11 and 12 illustrate another modified embodiment of the present invention. As illustrated in the drawings, right and left rear frames 325, 325 of a body frame 321 have a cross member 370 transversely disposed and secured thereto, the cross member 370 being provided with a bracket 374 having both side plates 371 and 372 secured thereto, the bracket 374 being protruded in the rearward direction. Thus, a front end of a rod member 353 is inserted in a space between both side plates 371 and 372 and then the rod member 353 is connected to the bracket 374 at its connecting point (a). This embodiment of the invention differs from the preceding embodiments in that the front end of the rod member 353 is connected directly to the body frame. A rear end of the rod member 353 is connected to a lower portion 355 of a rotary member 352 at its connecting point (b), whereas the body frame 321 is fixedly connected to the bracket 374 at its connecting point (c) which represents an axis of the cross member 370. Particularly, in this embodiment of the invention the direction of protrusion of the bracket 374 is selected such that the respective connecting points (a), (b) and (c) are located substantially along a straight line N, when a shock absorber 350 is subjected to contractive deformation in a fully compressed state or in an almost fully compressed state by way of upward swinging movement of a rear fork 333 and thereby an axial pulling force ($F_1$) works on the rod member 353 via the rotary member 352 due to a downward repulsive force caused by the shock absorber 350. In this manner, no twisting force on the bracket 374 is induced by the aforesaid pulling force ($F_1$). Thus, the force ($F_1$) is effective almost only in the form of pulling force. Due to the arrangement as described above, the bracket 374, designed so as to be lightweight and small in size can satisfactorily support any load exerted thereon even when the maximum or almost maximum shock absorbing force is generated by the shock absorber 350.

As illustrated in FIG. 12, the cross-member 370 and both rear frames 325, 325 have respective reinforcement frames 375, 375 obliquely arranged and fixedly secured thereto. This arrangement of the reinforcement frames 375, 375 provides truss structures 376, 376 at the area where the brackets 374 are secured to the body frame 321, the truss structures 376, 376 being such that the reinforcement frames 375, 375 extend in substantially the same direction as that of the aforesaid straight line N. Thus, an increased strength of the body frame 321 against the aforesaid pulling force ($F_1$) is achieved.

FIGS. 13 and 14 illustrate still another modified embodiment of the present invention. In this embodiment of the invention a rear fork 433 has a sheet of wall plate 471 provided on its upper surface 470, the wall plate 471 extending in the longitudinal direction of the motorcycle, as illustrated in the drawings. Above the upper surface 472 is arranged a driving chain 472 which is adapted to operatively connect an engine (not shown) to a rear wheel 432. Thus, the wall plate 471 is located between the chain 472 and a progressive mechanism 451 which is constructed of a rotary member 452 and a rod member 453. It is often found that mud splashed by the rear wheel 432 is carried together with the chain 472 and then is scattered away while the motorcycle is running. The wall plate 471 serves to prevent depositing of the scattered mud on the progressive mechanism 451, resulting in favorable protection of the same.

The wall plate 471 has an extension 471a at its rear end portion, the extension 471a extending in the transverse direction of the motorcycle and being located between the progressive mechanism 451 and the rear wheel 432. The extension 471a serves for additional prevention of the mud splashed by the rear wheel 432 from reaching the progressive mechanism 451. Further a plate member 473 is suspended from a rear part of an air cleaner case 429 arranged above the progressive mechanism 451 and has a lower extension in the vicinity of the aforesaid extension 471a of the wall plate 471 so as to be located in juxtaposition to the latter. The plate member 473 serves as a rear fender for the rear wheel 432 and provides additional prevention of the splashed mud from entering into the progressive mechanism 451.

FIG. 15 illustrates an example of the device in accordance with another preferred embodiment of the present invention which is intended to be applied to an on-road type of motorcycle. Specifically, a shock absorber 550 comprises an assembly of a coil spring 570 and a pneumatic damper 571. A front end of a rear fork 533 is pivotally connected to a bracket 525c of a body frame 521 by means of a pivot shaft 539, wherein the pivot shaft 539 serves for connecting a bracket member 531 to the bracket 525c of the body frame 521, the bracket member 531 being adapted to connect a rear part of an engine 526 to the body frame 521. A rotary member 552, which constitutes a progressive mechanism 551 together with a rod member 553 is pivotally connected to the rear fork 533 at a rear part 554b of its upper portion 554 thereof, whereas the upper portion 554 is pivotally connected to a lower end of the shock absorber 550 at its front part 554a. A lower portion 555 of the rotary member 552 is protruded downwardly through an opening 533g provided in the rear fork 533 and further its lower end 555a extends in the rearward direction. A rear end of the rod member 553 is pivotally connected to the lower end 555a of the rotary member 552, whereas a front end of the same is also pivotally connected to a bracket 574 of the body frame 521.

Because the rotary member 552 has the lower portion 555 thereof extending rearwardly to the end part 555a and the rod member 553 is connected to the end part 555a at its rear end, the connecting position of the rotary member 552 to the rod member 553 is dislocated rearwardly. Thus, in spite of the fact that the rotary member 552 has a wide sector angle at the front part 554a of the upper portion 554 thereof, it ensures the substantially same shock absorbing property as in the case of a smaller sector angle at the bent portion. Further, because the rotary member 552 has a wide sector angle at its bent portion and the lower portion 555 of the rotary member 552 is inserted through the opening 533g which is formed at a substantially right angle to the rear fork 533, the opening 533g has a reduced area and the rear fork 533 has an improved strength and rigidity.

A rear surface 576 of the opening 533g facing a rear surface 575 of the lower portion 555 of the rotary member 552 is lined with a resilient material 577 such as rubber or the like, and the rear surface 575 of the lower portion 555 of the rotary member 552 comes in surface contact with the resilient material 577 when the rear fork 533 reaches the lowermost position of its swinging movement. This allows the weight of the body exclusive of a rear wheel 532 and the rear fork 533 to be supported by the rear fork 533 with the aid of the resilient material 577. Thus this type of weight supporting will be performed in a more advantageous manner than in the case of supporting the weight of the body only with a shock absorbing device having a working stroke which reaches the extreme end.

Figure 16:
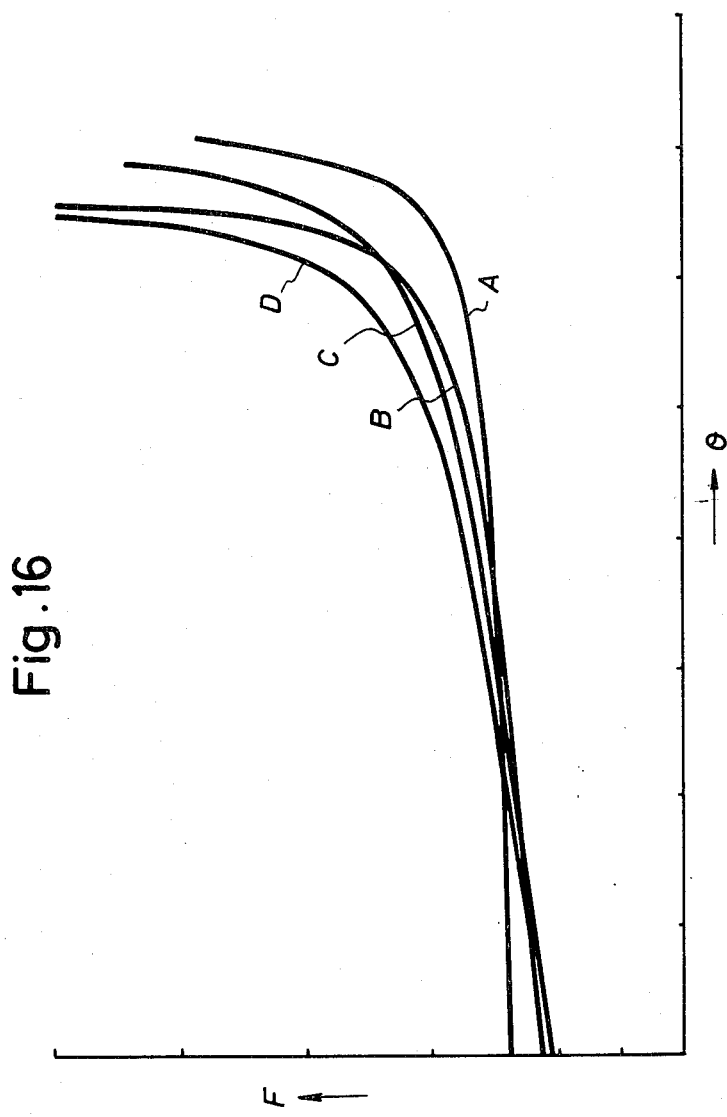
FIG. 16 is a characteristic diagram showing a shock absorbing property of the shock absorbing device relative to the swinging angle of the rear wheel support frame.

FIG. 16 illustrates a diagram which represents a relation between angle $\theta$ of swinging movement of the rear fork about the pivot shaft and shock absorbing force F of the shock absorber. If the rotary member has a wide sector angle, the rod member has a short length and thereby the connecting point of the rotary member to the rod member is dislocated toward the fore part of the body, as illustrated in FIG. 2. Thus, the increase ratio of the shock absorbing force F relative to the angle $\theta$ of swinging movement of the rear fork is at a low level, and, as the angle $\theta$ of swinging movement is increased and approaches to the ultimate range, the shock absorbing force F is abruptly increased, as represented by curve (A). If the rotary member has a reduced sector angle, or has a wide sector angle but its lower portion has a rearward extension at the lower part thereof, so that the connecting point of the rotary member to the rod member is dislocated toward the rear part of the body, as illustrated in FIGS. 6 and 15, the increase ratio of the shock absorbing force F relative to the angle $\theta$ of swinging movement is at a higher level than that in the preceding case of curve (A), as represented by curves (B), (C) and (D). Moreover it is found that the shock absorbing force F is abruptly increased in the range of lesser angles θ of swinging movement.

As described above, a shock absorbing device in accordance with the present invention is constructed such that the configuration of a rotary member and the length of a rod member are selectively determined to achieve the optimum shock absorbing property corresponding to road conditions, type of motorcycle, and other factors.

What is claimed is:

1. A shock absorbing device for a rear wheel of a motorcycle comprising a rear wheel support frame having a front end vertically swingably connected to a body frame, said rear wheel support frame rotatably supporting said rear wheel, a rotary member vertically rotatably connected to said rear wheel support frame, a shock absorber having an upper end pivotally connected to said body frame and a lower end connected to said rotary member, and a rod member connecting said rotary member to said body frame, wherein said rotary member is located ahead of a central part of said rear wheel support frame in the longitudinal direction of said motorcycle, said lower end of said shock absorber is pivotally connected to a front part of an upper portion of said rotary member in the longitudinal direction of said motorcycle, said rotary member is pivotally connected to said rear wheel support frame at a rear part of said upper portion thereof, and said rod member is pivotally connected at the front end thereof to a lower portion of said body frame and at the rear end thereof to a lower portion of said rotary member.

2. A shock absorbing device for a rear wheel of a motorcycle as set forth in claim 1, wherein the length of said rod member is adjustable.

3. A shock absorbing device for a rear wheel of a motorcycle as set forth in claim 1, wherein an engine is connected to said body frame at its rear part with an engine hanger bracket member, said engine hanger bracket member being formed in a gate-shaped configuration comprising a pair of side plates and a member for connecting said side plates, and said rod member is connected to said engine hanger bracket member at its front end.

4. A shock absorbing device for a rear wheel of a motorcycle as set forth in claim 3, wherein the position at which said rod member is connected to said engine hanger bracket member at said front end is located on each downward extension of said side plates of said bracket member, and a plurality of engine hanger bracket members are provided with downward extensions oriented so as to extend in relatively different directions with respect to the longitudinal direction of said motorcycle.

5. A shock absorbing device for a rear wheel of a motorcycle as set forth in claim 1, wherein said body frame has an intermediate bracket member which extends rearwardly to be connected thereby, and said rod member is connected to said body frame by way of said intermediate bracket member.

6. A shock absorbing device of a rear wheel of a motorcycle as set forth in claim 5, wherein said intermediate bracket member is connected to said body frame at its upper and lower positions.

7. A shock absorbing device for a rear wheel of a motorcycle as set forth in claim 1, wherein said body frame has a bracket which extends rearwardly to be connected to said rod member at its front end, and a connecting point of said rod member to said bracket, a connecting point of said rod member to said rotary member and a connecting point of said bracket to said body frame are located substantially along a straight line when said shock absorber is subjected to contractive deformation in a fully compressed state or in an almost fully compressed state.

8. A shock absorbing device for a rear wheel of a motorcycle as set forth in claim 7, wherein two rear frames of said body frame have a cross-member transversely disposed and secured thereto, said cross-member having said bracket secured thereto; and truss structures are formed by said rear frames, said cross-member, and obliquely extending reinforcement frames secured to said rear frames at the area where said bracket is arranged.

9. A shock absorbing device for a rear wheel of a motorcycle as set forth in claim 1, wherein a line of driving chain bridged between said engine and said rear wheel is adapted to move above an upper surface of said rear wheel support frame, and a wall plate is arranged on said upper surface in a standing manner, extending in the longitudinal direction, said wall plate being located between said chain and a progressive mechanism comprising said rotary member and said rod member.

10. A shock absorbing device for a rear wheel of a motorcycle as set forth in claim 9, wherein said wall plate has an extension at its rear end which extends in the transverse direction, said extension being located between said progressive mechanism and said rear wheel.

11. A shock absorbing device for a rear wheel of a motorcycle as set forth in claim 10, wherein an air cleaner case is arranged above said progressive mechanism, said air cleaner case having a plate member which extends downwardly from a rear part thereof to be located in juxtaposition to said extension of said wall plate.

12. A shock absorbing device for a rear wheel of a motorcycle as set forth in claim 1, wherein said rotary member is arranged at a central part of said rear wheel support frame, in the transverse direction, and said lower portion of said rotary member is protruded downwardly below said rear wheel support frame through an opening formed at a substantially right angle to said rear wheel support frame.

13. A shock absorbing device for a rear wheel of a motorcycle as set forth in claim 12, wherein said lower portion of said rotary member is formed with an end part which extends rearwards, said end part being connected to said rod member.

14. A shock absorbing device for a rear wheel of a motorcycle as set forth in claim 12, wherein a rear surface of said opening facing a rear surface of said lower portion of said rotary member is lined with a resilient material, and said rear surface of said lower portion of said rotary member comes in contact with a lining layer of said resilient material when said rear wheel support frame is displaced to its lowermost position of swinging movement thereof.

* * * * *